(12) United States Patent
Hoshi et al.

(10) Patent No.: US 11,247,684 B2
(45) Date of Patent: Feb. 15, 2022

(54) ELECTRIC POWER SUPPLY CONTROL APPARATUS FOR VEHICLE AND ELECTRIC POWER SUPPLY CONTROL METHOD FOR VEHICLE

(71) Applicant: SUBARU CORPORATION, Tokyo (JP)

(72) Inventors: Ryohei Hoshi, Tokyo (JP); Fumiyuki Moriya, Tokyo (JP); Hirofumi Yabe, Tokyo (JP); Ken Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 230 days.

(21) Appl. No.: 16/557,631

(22) Filed: Aug. 30, 2019

(65) Prior Publication Data
US 2020/0101973 A1 Apr. 2, 2020

(51) Int. Cl.
| | | |
|---|---|---|
| *B60W 30/188* | (2012.01) | |
| *B60W 10/30* | (2006.01) | |
| *B60L 1/08* | (2006.01) | |
| *B60L 50/60* | (2019.01) | |
| *B60L 58/26* | (2019.01) | |
| *B60L 58/27* | (2019.01) | |

(Continued)

(52) U.S. Cl.
CPC ..... *B60W 30/1886* (2013.01); *B60H 1/00971* (2013.01); *B60L 1/08* (2013.01); *B60L 50/60* (2019.02); *B60L 58/26* (2019.02); *B60L 58/27* (2019.02); *B60W 10/08* (2013.01); *B60W 10/30* (2013.01); *B60L 2240/34* (2013.01); *B60L 2240/42* (2013.01); *B60L 2240/545* (2013.01); *B60W 2510/246* (2013.01); *B60W 2510/305* (2013.01); *B60W 2710/246* (2013.01); *B60W 2710/305* (2013.01)

(58) Field of Classification Search
CPC .. B60W 30/1886; B60W 10/30; B60W 10/08; B60W 2510/305; B60W 2710/246; B60W 2710/305; B60L 1/08; B60L 50/60; B60L 58/26; B60L 58/27; B60L 2240/42; B60L 2240/34; B60L 2240/545; B60H 1/00971
See application file for complete search history.

(56) References Cited

U.S. PATENT DOCUMENTS 10,857,903 B2 * 12/2020 Sakai ................. H02J 13/00
2018/0111497 A1 * 4/2018 Li ..................... B60L 58/12

FOREIGN PATENT DOCUMENTS

| JP | 2012-044849 A | 3/2012 |
| KR | 101655155 B1 * | 9/2016 |

OTHER PUBLICATIONS

English translation of KR 101655155 (Year: 2016).*

* cited by examiner

*Primary Examiner* — Geepy Pe
*Assistant Examiner* — Kyle J Kingsland
(74) *Attorney, Agent, or Firm* — McGinn IP Law Group, PLLC

(57) ABSTRACT

An electric power supply control apparatus for a vehicle decreases a first electric power prior to switching the modes, when a sum of a request value of a second electric power and the first electric power exceeds a total electric power upper limit value in the mode before the switching, and switches the modes after the sum of the decreased first electric power and the request value of the second electric power becomes equal to or smaller than the total electric power upper limit value.

17 Claims, 4 Drawing Sheets

(51) Int. Cl.
*B60H 1/00* (2006.01)
*B60W 10/08* (2006.01)

ELECTRIC POWER SUPPLY CONTROL APPARATUS FOR VEHICLE AND ELECTRIC POWER SUPPLY CONTROL METHOD FOR VEHICLE

CROSS-REFERENCE TO RELATED APPLICATION

The present application claims priority from Japanese Patent Application No. 2018-187241 filed on Oct. 2, 2018, the entire contents of which are hereby incorporated by reference.

BACKGROUND

The disclosure relates to an electric power supply control apparatus for a vehicle.

In a related art, there has been known an electric power supply control apparatus for a vehicle including an electric motor capable of generating a driving force of the vehicle by receiving driving electric power from a battery and a temperature controller capable of controlling the temperature in a vehicle cabin by receiving temperature controlling electric power from the battery. For example, in Japanese Unexamined Patent Application (JP-A) No. 2012-44849, a control apparatus of an electric vehicle controls electric power so that a sum of electric power for driving an electric motor and electric power consumed by an in-cabin air conditioner becomes equal to or smaller than a maximum permissible output of a battery pack. Then, as the maximum permissible output decreases, initially, the consumable electric power by the in-cabin air conditioner is decreased towards a lowest ensuring electric power from a maximum electric power while maintaining the electric power for driving the electric motor at a substantially constant driving power ensuring electric power, whereby priority is given to the driving performance of the vehicle. Next, when the consumable electric power by the in-cabin air conditioner arrives at the lowest ensuring electric power, the decrease in consumable electric power is stopped, so that the consumable electric power is maintained at the lowest ensuring electric power, while the electric power for driving the electric motor is decreased below the driving power ensuring electric power whereby priority is given to the operation of the in-cabin air conditioner.

SUMMARY

An aspect of the disclosure provides an electric power supply control apparatus for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The apparatus is configured to execute a driving prioritizing mode in which a supply of the driving electric power is prioritized over a supply of the temperature controlling electric power within a range of an upper limit value of a predetermined driving electric power, and a temperature control prioritizing mode in which the supply of the temperature controlling electric power is prioritized over the supply of the driving electric power within a range of an upper limit value of a predetermined temperature controlling electric power upper limit value. The apparatus is configured to decrease a first electric power prior to switching the modes, when a sum of a request value of a second electric power and the first electric power exceeds a total electric power upper limit value in the mode before the switching, and switch the modes after the sum of the decreased first electric power and the request value of the second electric power becomes equal to or smaller than the total electric power upper limit value. The first electric power is the electric power of which supply is prioritized in each of the modes among the electric power of the driving electric power and the temperature controlling electric power. The second electric power is the electric power of which supply is not prioritized. The total electric power upper limit value is an upper limit value of electric power that can be used by at least one of the electric motor and the temperature controller within electric power that can be output by the battery.

An aspect of the disclosure provides an electric power supply control method for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The method includes executing a driving prioritizing mode in which a supply of the driving electric power is prioritized over a supply of the temperature controlling electric power within a range of an upper limit value of a predetermined driving electric power, and a temperature control prioritizing mode in which the supply of the temperature controlling electric power is prioritized over the supply of the driving electric power within a range of an upper limit value of a predetermined temperature controlling electric power upper limit value. The method includes decreasing a first electric power prior to switching the modes, when a sum of a request value of a second electric power and the first electric power exceeds a total electric power upper limit value in the mode before the switching, and switching the modes after the sum of the decreased first electric power and the request value of the second electric power becomes equal to or smaller than the total electric power upper limit value. The first electric power is the electric power of which supply is prioritized in each of the modes among the electric power of the driving electric power and the temperature controlling electric power. The second electric power is the electric power of which supply is not prioritized. The total electric power upper limit value is an upper limit value of electric power that can be used by at least one of the electric motor and the temperature controller within electric power that can be output by the battery.

An aspect of the disclosure provides an electric power supply control apparatus for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The apparatus includes circuitry. The circuitry is configured to execute a driving prioritizing mode in which a supply of the driving electric power is prioritized over a supply of the temperature controlling electric power within a range of an upper limit value of a predetermined driving electric power, and a temperature control prioritizing mode in which the supply of the temperature controlling electric power is prioritized over the supply of the driving electric power within a range of an upper limit value of a predetermined temperature controlling electric power upper limit value. The circuitry is configured to decrease a first electric power prior to switching the modes, when a sum of a request value of a second electric power and the first electric power exceeds a total electric power upper limit value in the mode before the switching, and switch the modes after the sum of the decreased first electric power and the request value of the second electric power becomes equal to or smaller than the total electric power upper limit value. The first electric power is the electric power of which supply is prioritized in each of the modes among the electric power of the driving electric power and the temperature controlling electric power. The second electric power is the electric power of which supply is not prioritized. The total electric power upper limit value is an upper limit value of electric power that can be used by at least one of the electric motor and the temperature controller within electric power that can be output by the battery.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
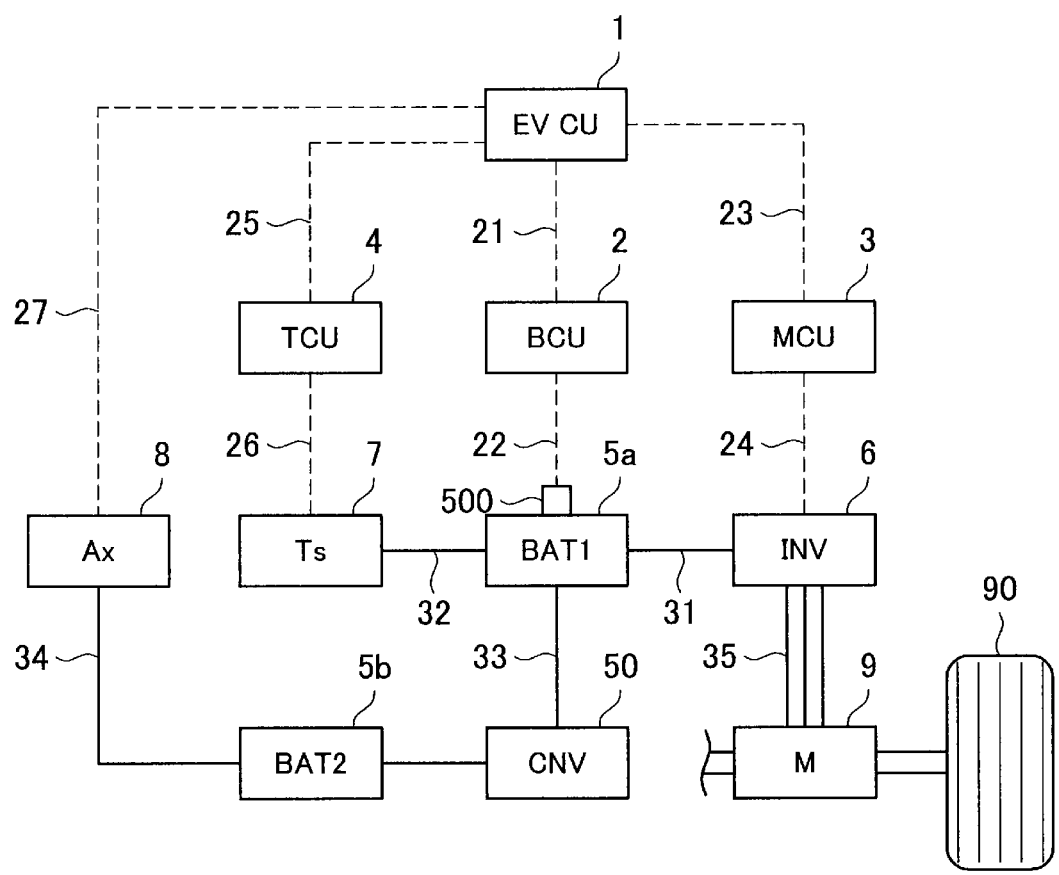
FIG. 1 is a schematic diagram illustrating a schematic configuration of a power supply system of an electric vehicle according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Hereinafter, a preferred embodiment of the disclosure will be described in detail by reference to accompanying drawings. In this specification and the accompanying drawings, like reference signs will be given to constituent elements having substantially like functional configurations, and the repetition of like descriptions will be omitted here.

The technique described in JP-A No. 2012-44849 takes into no consideration of a possibility that in switching modes of the vehicle between a mode where priority is given to the driving performance of the vehicle and a mode where priority is given to the operation of the in-cabin air conditioner, the sum of electric power consumed by the electric motor, that is, driving electric power and electric power consumed by the in-cabin air conditioner, that is, temperature controlling electric power exceeds the maximum permissible output of the battery pack.

Then, the disclosure has been made in view of the problem described above, and it is desirable to provide a novel and improved electric power supply control apparatus for, with an upper limit value of electric power, in electric power that a battery can output, that at least one of an electric motor and a temperature controller can use referred to as a total electric power upper limit value, restraining a sum of driving electric power and temperature controlling electric power from exceeding the total electric power upper limit value in switching modes of the vehicle between a driving prioritizing mode and a temperature control prioritizing mode.

Firstly, referring to FIG. 1, a schematic configuration of an electric power supply apparatus according an embodiment of the disclosure will be described. The electric power supply control apparatus is mounted on an electrically driven vehicle such as an electric vehicle. As illustrated in FIG. 1, the electrically driven vehicle, that is, an electric vehicle includes a high-voltage battery $5a$, a low-voltage battery $5b$, a motor 9, a temperature controller 7, and an auxiliary device 8.

The high-voltage battery $5a$ is a secondary battery and functions as a power source for the motor 9 and the temperature-controller 7. The high-voltage battery $5a$ is coupled to an inverter 6, the temperature-controller device 7, and a DC/DC converter 50 via power supply lines 31, 32, 33, respectively. An electric power of the high-voltage battery $5a$ is dropped down by the DC/DC converter 50 and is supplied to the low-voltage battery $5b$. The high-voltage battery $5a$ may be a primary battery, a fuel cell, or the like.

The motor 9 is an electric motor and is, for example, a three-phase synchronous motor. The inverter 6 is coupled to the motor 9 via a power supply line 35. A wheel 90 is coupled to the motor 9 via a reduction gear, a drive shaft, and the like. The high-voltage battery $5a$ discharges to thereby supply driving electric power to the motor 9 via the inverters 6. During power driving, the motor 9 functions as a drive motor, which is supplied with driving electric power to generate power for driving the wheel 90, that is, a driving force for driving the vehicle. During regeneration, the motor 9 also functions as a generator, and may be driven by power transmitted from the wheel 90 as the vehicle speed decreases to thereby generate electric power. Electric power generated by the motor 9 is supplied to the high-voltage battery $5a$ via the inverters 6, whereby the high-voltage battery $5a$ can be charged.

The temperature controller 7 has a first device and a second device as part of a thermal system for performing heat management in the vehicle. The first device is an air conditioner for controlling the temperature of air inside in the vehicle cabin, and the first device can heat (heating) or cool (cooling) an interior of the vehicle cabin by receiving temperature cooling electric power from the high-voltage battery $5a$. The first device is, for example, a heat pump fitted with an electric compressor configured to operate using the temperature controlling electric power and a heat exchanger. The first device may be an electric heater, such as a PTC heater, which operates using the temperature controlling electric power. The second device is a battery heater/cooler for controlling the temperature of the high-voltage battery 5a, and the second device can heat or cool the high-voltage battery 5a by receiving temperature controlling electric power from the high-voltage battery 5a. The second device is, for example, the heat pump common to the first device, and the second device may include a temperature controlling circuit through which a refrigerant of the air conditioner circulates. The second device may heat or cool the inverter 6.

The auxiliary device 8 includes electrical components and control units for indirectly assisting in driving the vehicle, and is coupled to the low-voltage battery 5b via a power supply line 34. The low-voltage battery 5b is a secondary battery having a voltage lower than that of the high-voltage battery 5a. The auxiliary device 8 operates by receiving auxiliary electric power from the low-voltage battery 5b. The electrical components include illuminating lamps, drive motors for such as wipers and power windows, defoggers or defrosters, and the like. A configuration may be adopted in which with the low-voltage battery 5b omitted, the electric power of the high-voltage battery 5a may be supplied directly to the auxiliary device 8 via the DC/DC converter 50.

As illustrated in FIG. 1, a control system of the electric vehicle includes a battery control unit 2, a motor control unit 3, a temperature control unit 4, and an EV control unit 1. Part or all of the control units 1 to 4 may be made up of, for example, a microcomputer or a microprocessor unit. The microcomputer or the like may have a general configuration in which a central processing unit (CPU) configured to execute various arithmetic operations, a read-only memory (ROM) configured to store various control programs, a random access memory (RAM) used as a work area for data storage and program execution, and an input/output interface (I/O) are provided, and these constituent devices are coupled to each other by a bidirectional common bus. Part or all of these control units may be configured by updatable firmware, for example, or may be a program module executed by a command from CPU, for example.

These control units 1 to 4 are coupled to each other via signal lines 21, 23, and 25, which are communication lines such as a controller area network (CAN), and exchange control information or various pieces of information on a control target with each other.

The battery control unit 2 is coupled to the high-voltage battery 5a via the signaling line 22. The high-voltage battery 5a includes a battery sensor 500. The battery sensor 500 detects states of the high-voltage battery 5a, that is, a temperature, voltage, current, and the like of the high-voltage battery 5a, and outputs the detected states of the high-voltage battery 5a to the battery control unit 2. The battery control unit 2 calculates, for example, a state of charge (SOC), a functional state, a degree of deterioration of the high-voltage battery 5a based on the received information and outputs the calculated information to the EV control unit 1 and the like.

The motor control unit 3 is coupled to the inverter 6 via the signal line 24. Information on a current (driving electric power) at the motor 9 is inputted into the motor control unit 3 from the inverter 6, and a signal indicating a revolution speed of the motor 9 is inputted into the motor control unit 3 from the motor 9. The motor control unit 3 calculates a command signal based on the received information and outputs the command signal calculated to the inverter 6, whereby the motor control unit 3 controls the torque or revolution speed of the motor 9.

The temperature control unit 4 is coupled to the temperature controller 7 via a signal line 26. Information, for example, on a current (temperature controlling electric power) at the controller 7 is inputted into the temperature control unit 4. The temperature control unit 4 calculates a command signal based on the received information and outputs the command signal calculated to the temperature controller 7, whereby the temperature control unit 4 controls the temperature controller 7. As a result, the temperature control unit 4 functions as part of the thermal system by controlling the temperature in the interior of the vehicle cabin, the high-voltage battery 5a, and the like.

The EV control unit 1 is coupled to the auxiliary device 8 via a signal line 27. The EV control unit 1 calculates command signals based on the information received by way of the signal lines 21, 23, 25, 27, and the like, and outputs the command signals calculated to the auxiliary device 8, the motor control unit 3, and the temperature control unit 4. The EV-control unit 1 controls the electric power of the vehicle in a unified fashion based on the state of the high-voltage battery 5a and controls the operating states of the auxiliary device 8, the motor 9, and the temperature-controller 7. As a result, the EV control unit 1 functions as an electric power supply control apparatus for the vehicle. Note that the signal lines 21 to 27 are simply signal transmission paths, and the signal lines may transmit signals not only in a wired fashion but also wirelessly.

The EV control unit 1 can execute a driving prioritizing mode and a temperature control prioritizing mode. The driving prioritizing mode is a mode in which a supply of driving electric power is prioritized over a supply of temperature controlling electric power within a range up of an upper limit value of a predetermined driving electric power. The temperature control prioritizing mode is a mode in which a supply of temperature controlling electric power is prioritized over a supply of driving electric power within a range of an upper limit value of a predetermined temperature controlling electric power. Hereinafter, in each prioritizing mode, of driving electric power and temperature controlling electric power, electric power of which supply is prioritized will be referred to as a first electric power W11, while electric power of which supply is prioritized will be referred to as a second electric power W12. The EV control unit 1 executes the driving prioritizing mode by setting the first electric power W11 as driving electric power and setting the second electric power W12 as temperature controlling electric power. The EV unit executes the temperature control prioritizing mode by setting the first electric power W11 as temperature controlling electric power and setting the second electric power W12 as driving electric power.

Figure 2:
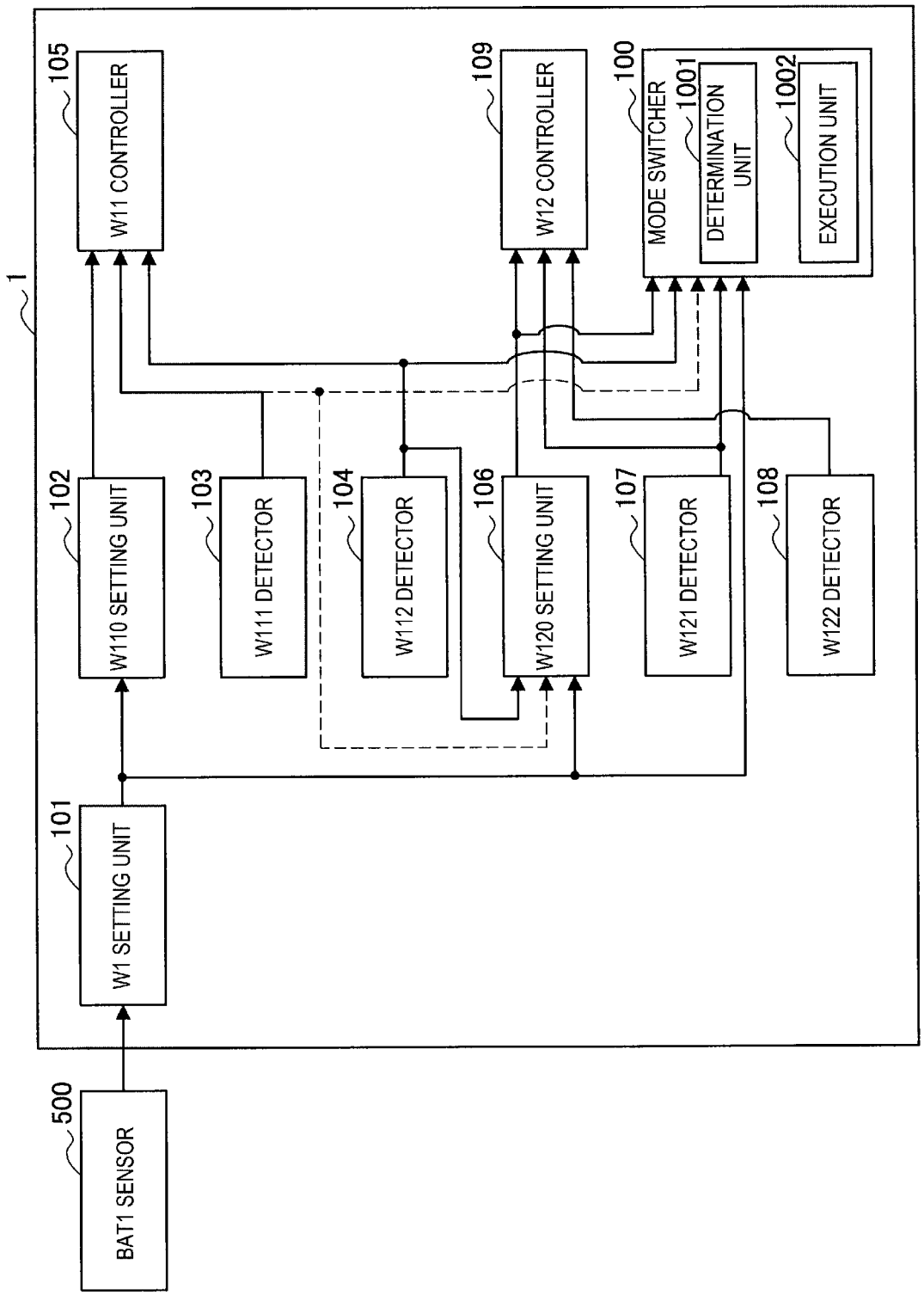
FIG. 2 is a functional block diagram of an EV control unit according to the embodiment.

As illustrated in FIG. 2, the EV control unit 1 includes, as individual functional units, a total electric power upper limit value setting unit 101, a first electric power upper limit value setting unit 102, a first electric power request value detector 103, a first electric power actual value detector 104, a first electric power controller 105, a second electric power upper limit value setting unit 106, a second electric power request value detector 107, a second electric power actual value detector 108, a second electric power controller 109, and a mode switcher 100.

The total electric power upper limit value setting unit 101 sets a total electric power upper limit value W1. Specifically, the total electric power upper limit value setting unit 101 calculates allowable output electric power W0, which is electric power that the high-voltage battery 5*a* can output, based on a signal from the battery sensor 500. The unit 101 sets a value obtained by subtracting auxiliary device operating electric power W2, which is electric power for use in operating the auxiliary device 8, from the allowable output electric power W0 as the total electric power upper limit value W1. The total electric power upper limit value W1 is an upper limit value of electric power usable for at least one of the motor 9 and the temperature controller 7, in the electric power W0 that the high-voltage battery 5*a* can output. The auxiliary device operating electric power W2 may be a predetermined value set in advance, or may be a value calculated based on a signal from the auxiliary device 8 or the low-voltage battery 5*b*.

Figure 3:
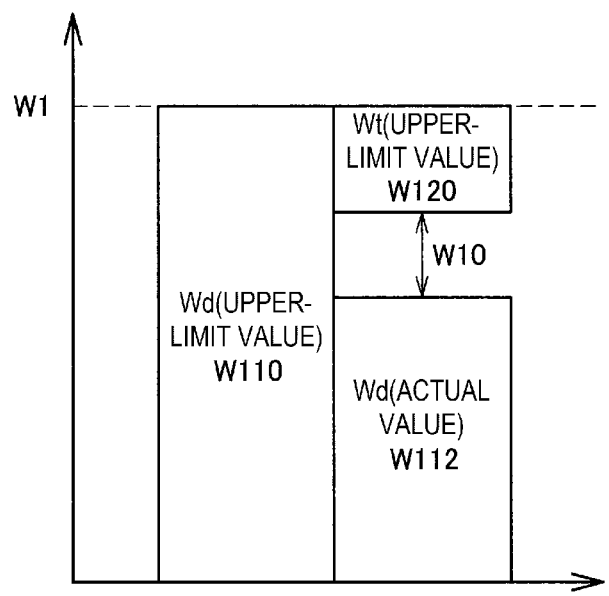
FIG. 3 is a graph illustrating magnitudes of variables when a driving prioritizing mode according to the embodiment is executed.
Figure 4:
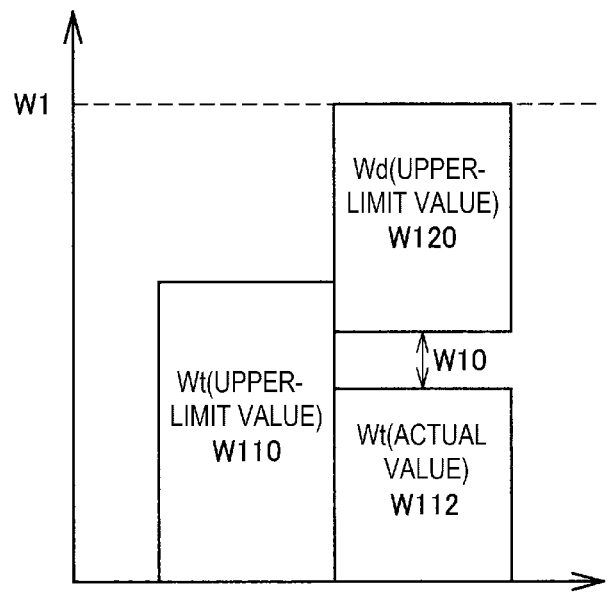
FIG. 4 is a graph illustrating magnitudes of variables when a temperature control prioritizing mode according to the embodiment is executed.

The first electric power upper limit value setting unit 102 sets an upper limit value W110 of the first electric power W11 to a predetermined value equal to or less than the total electric power upper limit value W1. Specifically, when the driving electric power Wd is set to the first electric power W11, that is, when the driving-prioritizing mode is selected, as illustrated in FIG. 3, the first electric power upper limit value setting unit 102 sets the driving electric power upper limit value W110 (driving permissible electric power) to the total electric power upper limit value W1. When the value of a rated output (a rated value) of the motor 9 is equal to or less than the total electric power upper limit value W1, the unit 102 may set the driving electric power upper limit value W110 to the rated value. When the temperature controlling electric power Wt is set to the first electric power W11, that is, when the temperature control prioritizing mode is selected, as illustrated in FIG. 4, the unit 102 sets the temperature controlling electric power upper limit value W110 (temperature controlling permissible electric power) to the value of a rated output (a rated value) of the temperature controller 7. This rated value is a predetermined value equal to or less than the total electric power upper limit value W1. When the value of the rated output of the temperature controller 7 is equal to or greater than the total electric power upper limit value W1, the unit 102 may set the upper limit value W110 of the temperature controlling electric power Wt to the total electric power upper limit value W1.

The first electric power request value detector 103 detects a request value W111 for the first electric power W11. When the first electric power W11 is the driving electric power Wd, the request value W111 is determined in accordance with, for example, the magnitude of a driving force that the driver requests the vehicle to output. The magnitude of the requested driving force can be detected based on, for example, an operation or depression amount of an accelerator pedal. When the first electric power W11 is the temperature controlling electric power Wt, the request value W111 is determined in accordance with, for example, an operation amount of the first device (the air conditioner) of the temperature controller 7. This operation amount can be detected, for example, based on a set temperature for the interior of the vehicle cabin. The first electric power actual value detector 104 detects an actual value of the first electric power W11, that is, an actual value W112. The first electric power controller 105 executes a feedback control so that the actual value 112 of the first electric power W11 converses to the request value W111 within a range up to the upper limit value W110.

The second electric power upper limit value setting unit 106 sets an upper limit value W120 of the second electric power W12 so that a sum of the upper limit value W120 of the second electric power W12 and the actual value W112 of the first electric power W11 is equal to or less than the total electric power upper limit value W1. Specifically, the second electric power upper limit value setting unit 106 sets the upper limit value W120 of the second electric power W12 so that the sum (W120+W112) of the upper limit value W120 of the second electric power W12 and the actual value W112 of the first electric power W11 is smaller than the total electric power upper limit value W1. As a result, as illustrated in FIGS. 3 and 4, a margin W10 can be set, the margin W10 constituting a difference between the sum (W120+W112) and the total electric power upper limit value W1. The margin W10 is an allowance of the total electric power upper limit value W1 with respect to the sum (W120+W112) and is larger than zero. Although not illustrated, the margin W10 has a first margin W101 and a second margin W102.

For example, when the actual value W112 of the first electric power W11 is relatively small within a range up to smaller than the upper limit value W110, the second electric power upper limit value setting unit 106 sets the upper limit value W120 of the second electric power W12 to a predetermined maximum value. A value obtained by subtracting the maximum value of the upper limit value W120 and the actual value W112 of the first electric power W11 from the total electric power upper limit value W1 becomes the first margin W101. When the actual value W112 of the first power W11 is relatively large within the range up to smaller than the upper limit value W110, the second electric power upper limit value setting unit 106 sets the margin W10 to the second margin W102, which is smaller than the first margin W101, and sets a value obtained by subtracting the actual value W112 of the first electric power W11 and the second margin W102 from the total electric power upper limit value W1 to the upper limit value W120 of the second electric power W12. The upper limit value W120 is set to be smaller than the maximum value described above. When the actual value W112 of the first electric power W11 arrives at the upper limit value W110, the second electric power upper limit value setting unit 106 sets the margin W10 to zero, and sets a value obtained by subtracting the upper limit value W110 of the first electric power W11 from the total electric power upper limit value W1 to the upper limit value W120 of the second electric power W12.

The second electric power upper limit value setting unit 106 sets the second margin W102 in accordance with a maximum permissible increasing rate of the first electric power W11 and a control response of the second electric power W12. That is, when the maximum permissible increasing speed of the first electric power W11 is great, the second margin W102 is set greater than when the maximum permissible increasing rate is small. When the control response of the second electric power W12 is low, the second margin W102 is set greater than when the control response of the second electric power W12 is high.

For example, a mode for controlling the driving force of the vehicle includes a first mode prioritizing the driving performance of the vehicle and a second mode prioritizing the economy, and the driver may be able to switch the driving force control mode between these two modes. In this case, the maximum permissible increasing rate of the first electric power W11, that is, driving electric power Wd in the driving prioritizing mode can be set greater in the first mode than in the second mode. The maximum permissible increasing rate of the driving electric power Wd has a function of improving the driving performance or the driving feel by suppressing a sudden change in driving electric force, that is, a sudden change in driving force, and from such a viewpoint, a maximum permissible decreasing rate of driving electric power Wd may be provided. In addition, after the direction of the driving force is reversed from a negative direction to a positive direction as a result of the operation state of the motor 9 changing from regeneration to power driving, there may be a case where a control is performed to reduce the looseness of gears between the motor 9 and the wheel 90. In this case, the maximum permissible increasing rate of the first electric power W11, that is, driving electric power Wd during the driving prioritizing mode can be set greater than when the motor 9 is in normal operation. In the case described above, the second margin W102 is advantageously set great in accordance with an increase in the maximum permissible increasing rate. Since the maximum permissible increasing rate of driving electric power Wd can also vary depending on vehicle conditions such as vehicle speed and acceleration, the second margin W102 is advantageously set in accordance with a variation in the maximum permissible increasing rate.

As indicated by a broken lined arrow in FIG. 2, the second electric power upper limit value setting unit 106 may use the request value W111 of the first electric power W11 in place of the actual value W112 of the first electric power W11 or together with the actual value W112 in setting the upper limit value W120 of the second electric power W12 and the margin W10 as described above. In executing the setting described above, the second electric power upper limit value setting unit 106 may use a command value of the first electric power W11 in place of the actual value W112 of the first electric power W11 or together with the actual value W112. The electric power command value is, for example, a command value that the EV control unit outputs to the motor control unit 3 or the like.

The second electric power request value detector 107 detects a request value W121 of the second electric power W12 in the same way as the way in which the first electric power request value detector 103 does. The second electric power actual value detector 108 detects an actual value W122 of the second power W12. The second electric power controller 109 executes a feedback control so that the actual value W122 of the second electric power W12 converges to the request value W121 within a range up to the upper limit value W120 or smaller.

The mode switcher 100 switches the priority modes of the vehicle between the driving prioritizing mode and the temperature control prioritizing mode. The mode switcher 100 includes a determination unit 1001 for determining on switching of the priority modes, and an execution unit 1002 for executing switching of the priority modes.

Figure 5:
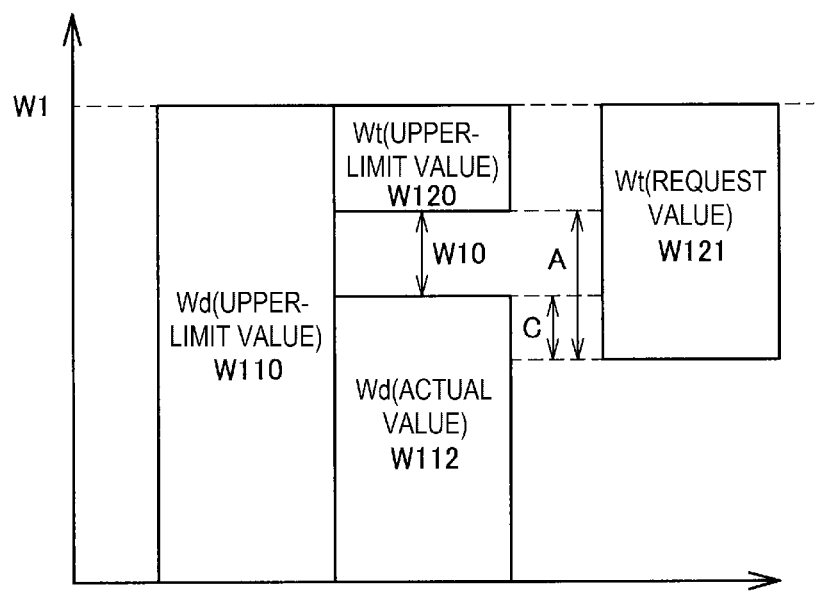
FIG. 5 is a graph illustrating magnitudes of variables when a switching between the prioritizing modes according to the embodiment is determined over.

As illustrated in FIG. 5, the determination unit 1001 determines to switch the priority modes when the request value W121 of the second electric power W12 becomes larger than the upper limit value W120 of the second electric power W12 and a difference A between the request value W121 and the upper limit value W120 of the second electric power W12 becomes equal to or greater than a first predetermined value in the priority mode before the switching. The first predetermined value may be the margin W10 in the priority mode before the switching, for example, the second margin W102. For example, during the temperature control prioritizing mode, when the request value W121 of the driving electric power Wd becomes greater by the first predetermined value or greater than the upper limit value W120 as a result of the driver depressing the accelerator pedal greatly or quickly, for example, when the request value W121 becomes greater than the second margin W102 in the temperature control prioritizing mode in question, the determination unit 1001 determines on switching from the temperature control prioritizing mode to the driving prioritizing mode. On the other hand, during the driving prioritizing mode, for example, when the request value W121 of the temperature controlling electric power Wt becomes greater by the first predetermined value or greater than the upper limit value 120, for example, by the second margin W102 in the driving prioritizing mode or greater than the upper limit value 120 due to a difference in temperature between a set temperature of the first device (the air conditioner) of the temperature controller 7 and the temperature in the interior of the vehicle cabin, the determination unit 1001 determines that the driving prioritizing mode is switched to the temperature control prioritizing mode.

In addition, during the temperature control prioritizing mode, when the driving electric power upper limit value W120 decreases below a predetermined minimum value as the SOC of the high-voltage battery 5a decreases and the total electric power upper limit value W1 decreases, the determination unit 1001 may determine on switching to the driving priority mode. Alternatively, during the temperature control prioritizing mode, when the driver switches the drive mode of the vehicle from the second mode prioritizing the economy to the first mode prioritizing the driving performance, the unit 1001 may determine on switching to the driving prioritizing mode. On the other hand, when the driver switches the drive mode of the vehicle from the first mode to the second mode during the driving prioritizing mode, the unit 1001 may determine on switching to the temperature control prioritizing mode.

Figure 6:
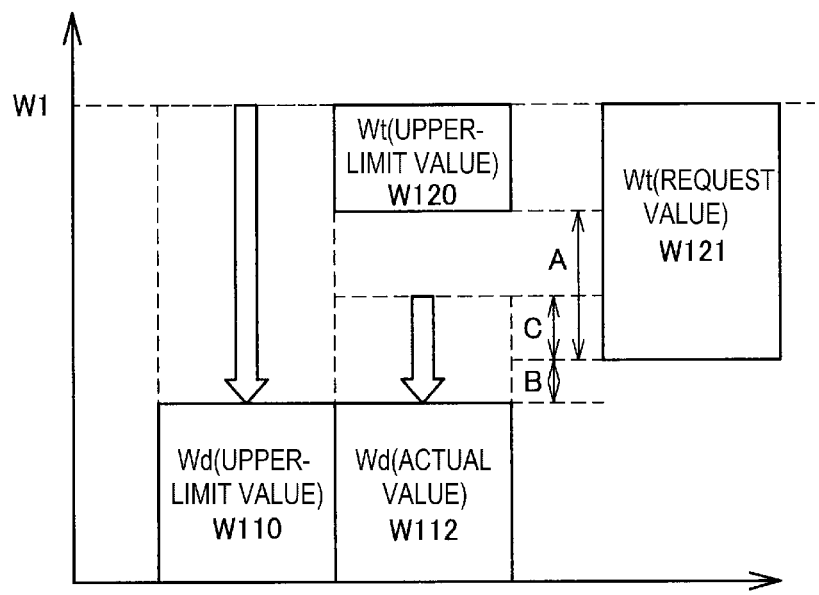
FIG. 6 is a graph illustrating magnitudes of variables when a switching is executed between the prioritizing modes according to the embodiment.

As illustrated in FIG. 6, in the priority mode before switching, when a sum (W121+W112) of the request value W121 of the second electric power W12 and the actual value W112 of the first electric power W11 exceeds the total electric power upper limit W1, the execution unit 1002 decreases the actual value W112 of the first electric power W11, and switches the priority modes after the sum (W121+W112) of the actual value W112 of the first electric power W11 and the request value W121 of the second electric power W12 decreases to the total electric power upper limit value W1 or lower. Specifically, the execution unit 1002 decreases the upper limit value W110 of the first electric power W11, and switches the priority modes after a value B obtained by subtracting the upper limit value W110 and the request value W121 of the second electric power W12 from the total electric power upper limit value W1 becomes equal to or greater than a second predetermined value. The second predetermined value may be the margin W10 in the priority mode after the switching, for example, the second margin W102.

For example, as illustrated in FIG. 5, in the case where the priority mode before switching is the driving priority mode, when the determination unit 1001 determines on switching to the temperature control prioritizing mode, a sum of the request value W121 of the temperature controlling electric power Wt, which is the second electric power W12, and the actual value W112 of the driving electric power Wd, which is the first electric power W11, may exceed the total electric power upper limit value W1 by an amount indicated by C from time to time. At this time, as illustrated in FIG. 6, the execution unit 1002 decreases the driving electric power Wd, and switches the priority mode to the temperature control prioritizing mode after the sum of the driving electric power Wd and the request value W121 of the temperature controlling electric power Wt becomes equal to or smaller than the total electric power upper limit value W1. Specifically, the execution unit 1002 decreases the upper limit value W110 of the driving electric power Wd to thereby decrease the actual value W112 of the driving electric power Wd. The execution unit 1002 switches the priority modes after the value B resulting from subtracting the upper limit value W110 or the actual value W112 and the request value W121 of the second electric power W12 from the total electric power upper limit value W1 becomes equal to or greater than the second predetermined value, for example, when the value B becomes equal to or greater than the second margin W102 in the temperature control prioritizing mode.

The execution unit 1002 may limit at least one of an increasing rate and a decreasing rate of driving electric power Wd or temperature controlling electric power Wt during switching the priority modes to a predetermined permissible value or lower. For example, the execution unit 1002 may set a permissible value that limits a changing speed of driving electric power Wd during mode switching to a value that enables the driving performance or the driving feel to be improved by suppressing the occurrence of a sudden change in driving electric power Wd, that is, a sudden change in driving force. At this time, the permissible value may be set greater in the first mode prioritizing the driving performance than in the second mode prioritizing the economy. The unit 1002 may change the permissible value depending on the state of the vehicle such as vehicle speed, acceleration and the like.

Next, the working effect will be described. As described heretofore, in switching the priority modes, when the sum of the request value W121 of the second electric power W12 and the actual value W112 of the first electric power W11 exceeds the total electric power upper limit value W1 in the priority mode before switching, the EV control unit 1 decreases the actual value W112 of the first electric power W11 and then switches the priority modes after the sum of the actual value W112 of the first electric power W11 and the request value W121 of the second electric power W12 becomes equal to or smaller than the total electric power upper limit value W1. Thus, in switching the priority modes, the sum of driving electric power Wd and temperature controlling electric power Wt can be restrained from exceeding the total electric power upper limit value W1. For example, a situation where the sum of driving electric power Wd and the temperature controlling electric power Wt exceeds the total electric power upper limit value W1 due to a decrease in actual value W112 of the first electric power W11 not catching up with an increase in actual value W122 of the second electric power W12 towards the request value W121 thereof during or immediately after switching of the priority modes can be restrained from occurring.

From this point of view, the execution unit 1002 of the EV control unit 1 may determine whether the sum of the request value W121 of the second electric power W12 and the request value W111 of the first electric power W11 exceeds the total electric power upper limit value W1 in the priority mode before switching as indicated by the broken lined arrow in FIG. 2. Additionally, the execution unit 1002 of this example decreases the upper limit value W110 of the first electric power W11 in order to decrease the actual value W112 of the first electric power W11, but the disclosure is not limited to this configuration, and hence, the execution unit 1002 may switch the priority modes after the sum of the command value of the first electric power W11 and the request value W121 of the second electric power W12 becomes equal to or smaller than the total electric power upper limit value W1.

In each of the priority modes, the EV control unit 1 supplies the first electric power W11 in preference to the second electric power W12 within a range up to the predetermined upper limit value W110 or smaller. Therefore, the magnitude of one electric power of the driving electric power Wd and the temperature controlling electric power Wt is not limited in advance in any way by the upper limit value of the other electric power, and the magnitude of the one electric power is limited by its own limited value. Therefore, since a usable range of each electric power can be expanded, the motor performance or the driving performance of the vehicle by the motor 9 using the driving electric power Wd and temperature controlling performance by the temperature controller 7 using the temperature controlling electric power Wt can be made compatible with each other at a high degree. For example, in the driving prioritizing mode, the EV control unit 1 sets the upper limit value of the driving electric power Wd to the total electric power upper limit value W1. Therefore, since the usable range of the driving electric power Wd can be expanded, the driving performance of the vehicle by the motor 9 using the driving electric power Wd can be improved.

Specifically, the EV control unit 1 sets the upper limit value W110 of the first electric power W11 to a predetermined value which is equal to or smaller than the total electric power upper limit value W1 and is not limited by the second electric power W12. Since a usable amount of the first electric power W11 is not limited in advance by the upper limit value W120 of the second electric power W12, the usable range of the first electric power W11 can be expanded. On the other hand, the EV control unit 1 sets the upper limit value W120 of the second electric power W12 so that the sum of the upper limit value W120 of the second electric power W12 and the actual value W112 of the first electric power W11 becomes equal to or smaller than the total electric power upper limit value W1. As a result, the sum of the actual value W112 of the first electric power W11 and the actual value W122 of the second electric power W12 can be restrained from exceeding the total electric power upper limit value W1. In addition, since the upper limit value W120 of the second electric power W12 is finely set in accordance with the actual value W112 of the first electric power W11, a usable range of the second electric power W12 can be effectively expanded. From this viewpoint, the first electric power W11 used in setting the upper limit value W120 of the second electric power W12 is not limited to the actual value W112 but may be the request value W111.

When expanding the respective usable ranges of the first and second electric powers as described above, a sum of an upper limit value W110 of the first electric power W11 in the priority mode before switching and an upper limit value W110 of the first electric power W11 in the priority mode after switching may constitute a great value exceeding the total electric power upper limit value W1. Therefore, in switching the priority modes, there may be a high possibility that the sum of driving electric power Wd and temperature controlling electric power Wt exceeds the total electric power upper limit value W1 due to the reason that a decrease in electric power executed for preference before switching does not catch up with an increase in electric power executed for preference after switching. In such a case, as described above, by switching the priority modes after decreasing the first electric power W11 before switching, the possibility described above can be suppressed effectively. For example, in case the usable range of the driving electric power Wd is expanded as described above, in switching the priority modes from the driving prioritizing mode to the temperature control prioritizing mode, there may be a high possibility that the sum of the request value of the temperature controlling electric power Wt and the actual value of the driving electric power Wd exceeds the total electric power upper limit value W1. On the other hand, by switching the priority modes after the driving electric power Wd is decreased, the possibility described above can be suppressed effectively.

In each of the priority modes, the EV control unit 1 sets the upper limit value W120 of the second electric power W12 so that the sum of the upper limit value W120 of the second electric power W12 and the actual value W112 of the first electric power W11 is smaller than the total electric power upper limit value W1. Therefore, the margin W10 can be set. The margin W10 constitutes a difference between the upper limit value W120 of the second electric power W12 and the actual value W112 of the first electric power W11. By using this margin W10 as an allowance, even when, for example, one of the temperature controlling electric power Wt and the driving electric power Wd increases in each priority mode, a risk of the sum of both the electric powers exceeding temporarily the total electric power upper limit value W1 due to a delay in control of the other electric power can be avoided. From this viewpoint, the first electric power W11 for use in setting the margin W10 is not limited to the actual value W112 but may be the request value W111.

The EV control unit 1 determines on switching the priority modes when the request value W121 of the second electric power W12 becomes greater than the upper limit value W120 of the second electric power W12 and the difference A between the request value W121 of the second electric power W12 and the upper limit value W120 of the second electric power W12 becomes equal to or greater than the first predetermined value in the priority mode before switching. As described above, by determining on switching the priority modes when the request value W121 of the second power W12 becomes greater than the upper limit value W120 of the second power W12, a request for the increasing second electric power W12 can be met. With the difference A between the request value W121 and the upper limit value W120 of the second electric power W12 being equal to or greater than the first predetermined value, in switching the priority modes, that is, during or immediately after switching the priority modes, there may be a high possibility that the sum of the driving electric power Wd and the temperature controlling electric power Wt exceeds the total electric power upper limit value W1. In such a case, the possibility described above can be suppressed effectively by switching the priority modes after the first electric power W11 is decreased.

The EV control unit 1 may set the upper limit value W120 of the second electric power W12 so that the sum of the upper limit value W120 of the second electric power W12 and the actual value W112 of the first electric power W11 becomes smaller the first predetermined value or greater than the total electric power upper limit value W1 in the priority mode before switching. In other words, the first predetermined value may be set at the same value as the margin W10 in the priority mode before switching. In this case, in the priority mode before the switching, in switching the priority modes as a result of the difference A between the request value W121 of the second electric power W12 and the upper limit value W120 of the second electric power W12 becoming equal to or greater than the first predetermined value, since the difference A is equal to or greater than the margin W10, there may be a high possibility that the sum of the driving electric power Wd and the temperature controlling electric power Wt exceeds the total electric power upper limit value during or immediately after switching the priority modes. In such a case, the possibility described above can be suppressed effectively by switching the priority modes after the first electric power W11 is decreased.

In switching the priority modes, the EV control unit 1 switches the priority modes after the value B obtained by subtracting the actual value W112 of the first electric power W11 that is decreased as described above and the request value W121 of the second electric power W12 from the total electric power upper limit value W1 becomes equal to or greater than the second predetermined value. Therefore, in switching the priority modes, that is, during or immediately after switching the priority modes, the risk of the sum of driving electric power Wd and temperature controlling electric power Wt exceeding the total electric power upper limit value W1. From this viewpoint, the EV control unit 1 may control the actual value W112 of the first electric power W11 decreased as described above so that the value B is maintained at or above the second predetermined value during switching of the priority modes.

The EV control unit 1 may set the upper limit value W120 of the second electric power W12 so that the sum of the upper limit value W120 of the second electric power W12 and the actual value W112 of the first electric power W11 becomes smaller the second predetermined value or greater than the total electric power upper limit value W1 in the priority mode after switching. In other words, the second predetermined value may be set at the same value as the margin W10 in the priority mode after switching. Therefore, even though the electric power changes immediately after switching the priority modes as a result of the second value functioning as the margin in the priority mode after switching, the sum of driving electric power Wd and temperature controlling electric power Wt can be restrained from exceeding the total electric power upper limit value W1.

From the viewpoint described above, the EV control unit 1 may set the upper limit value W120 of the second electric power W12 so that a sum of the upper limit value W120 of the second electric power W12 and the request value W111 of the first electric power W11 becomes smaller the first predetermined value or greater than the total electric power upper limit value W1 in the priority mode before switching. In addition, in the priority mode after switching, the EV control unit 1 may set the upper limit value W120 of the second electric power W12 so that the sum of the upper limit value W120 of the second electric power W12 and the request value W111 of the first electric power W11 becomes smaller the second predetermined value or greater than the total electric power upper limit value W1.

The EV control unit 1 may limit at least one of the increasing rate and the decreasing rate of the driving electric power Wd during switching the priority modes to or smaller than a predetermined permissible value. For example, the EV control unit 1 may limit the decreasing rate of the driving electric power Wd to or smaller than the permissible value during switching the priority mode from the driving prioritizing mode to the temperature control prioritizing mode. In this case, the motor performance or the driving performance of the vehicle during switching the priority modes can be improved.

In the priority mode before switching, the first electric power W11 may be the driving electric power Wd and the second electric power W12 may be the temperature controlling electric power Wt. In this case, the priority mode of the vehicle is switched from the driving prioritizing mode to the temperature control prioritizing mode. Here, from the viewpoint as described above, a maximum permissible decreasing rate is advantageously provided for the driving electric power Wd. At this time, a limitation is imposed on the decreasing rate of the driving electric power Wd. On the other hand, in general, the control response is high in driving electric power Wd than in temperature controlling electric power Wt. Therefore, there may be a high possibility that the sum of driving electric power Wd and temperature controlling electric power Wt exceeds the total electric power upper limit value W1 due to a decrease in driving electric power Wd being unable to catch up with an increase in temperature controlling electric power Wt towards the request electric power during or immediately after switching from the driving prioritizing mode to the temperature control prioritizing mode. On the other hand, in switching from the driving prioritizing mode to the temperature control prioritizing mode, even though the sum of the request value W121 of the temperature controlling electric power Wt and the driving electric power Wd exceeds the total electric power upper limit value W1, the driving electric power Wd is decreased, and the priority modes are switched over after the sum of the driving electric power W11 and the request value W121 of the temperature controlling electric power Wt becomes equal to or smaller than the total electric power upper limit W1, whereby the possibility described above can be suppressed effectively.

Thus, while the preferred embodiment of the disclosure has been described in detail by reference to the accompanying drawings, the disclosure is not limited to the embodiment. It is obvious that those having ordinary skill in the art to which the disclosure pertains can arrive at various alterations or modifications without departing from the scope of the technical idea described in claims, and it is understood that these alterations or modifications naturally fall within the technical scope of the disclosure.

For example, the vehicle to which the power supply control apparatus and the power supply control method of the disclosure are applied may be any vehicle capable of generating a driving force by an electric motor and hence is not limited to an electric vehicle but may be, for example, a hybrid vehicle that includes an internal combustion engine in addition to the electric motor as a source of driving force while being capable of running in an EV mode. The hybrid vehicle may be a plug-in hybrid vehicle that can be charged from an external power supply source.

The invention claimed is:

1. An electric power supply control apparatus for a vehicle, the vehicle comprising;
   a battery;
   an electric motor configured to generate a driving force of the vehicle by receiving driving electric power from the battery; and
   a temperature controller configured to heat or cool at least one of a vehicle cabin and the battery by receiving temperature controlling electric power from the battery, the electric power supply control apparatus for the vehicle being configured to execute:
      a driving prioritizing mode in which a supply of the driving electric power is prioritized over a supply of the temperature controlling electric power within a range of an upper limit value of a predetermined driving electric power; and
      a temperature control prioritizing mode in which the supply of the temperature controlling electric power is prioritized over the supply of the driving electric power within a range of an upper limit value of a predetermined temperature controlling electric power upper limit value, and
   decrease a first electric power prior to switching the modes when a sum of a request value of a second electric power and the first electric power exceeds a total electric power upper limit value in the mode before the switching, and switch the modes after the sum of the decreased first electric power and the request value of the second electric power becomes equal to or smaller than the total electric power upper limit value, the first electric power being the electric power of which supply is prioritized in each of the modes among the electric power of the driving electric power and the temperature controlling electric power, the second electric power being the electric power of which supply is not prioritized, and the total electric power upper limit value being an upper limit value of electric power that can be used by at least one of the electric motor and the temperature controller within electric power that can be output by the battery.

2. The electric power supply control apparatus for the vehicle according to claim 1, wherein the apparatus is configured to determine on switching the modes when the request value of the second electric power becomes greater than an upper limit value of the second electric power, and a difference between the request value and the upper limit value of the second electric power becomes a first predetermined value or greater in the mode before the switching.

3. The electric power supply control apparatus for the vehicle according to claim 2, wherein the apparatus is configured to set the upper limit value of the second electric power so that a sum of the upper limit value of the second electric power and the first electric power becomes smaller than the first predetermined value or greater than the total electric power upper limit value in the mode before the switching.

4. The electric power supply control apparatus for the vehicle according to claim 1, wherein the apparatus is configured to
   in switching the modes, decrease an upper limit value of the first electric power in the mode before the switching, and switch the modes after a value resulting from subtracting the upper limit value of the first electric power and the request value of the second electric power from the total electric power upper limit value becomes a second predetermined value or greater, and
   set the upper limit value of the second electric power so that the sum of the upper limit value of the second electric power and the first electric power becomes smaller than the total electric power upper limit value by the second predetermined value or greater in a mode after the switching.

5. The electric power supply control apparatus for the vehicle according to claim 2, wherein the apparatus is configured to
   in switching the modes, decrease an upper limit value of the first electric power in the mode before the switching, and switch the modes after a value resulting from subtracting the upper limit value of the first electric power and the request value of the second electric power from the total electric power upper limit value becomes a second predetermined value or greater, and
   set the upper limit value of the second electric power so that the sum of the upper limit value of the second electric power and the first electric power becomes smaller than the total electric power upper limit value by the second predetermined value or greater in a mode after the switching.

6. The electric power supply control apparatus for the vehicle according to claim 3, wherein the apparatus is configured to in switching the modes, decrease an upper limit value of the first electric power in the mode before the switching, and switch the modes after a value resulting from subtracting the upper limit value of the first electric power and the request value of the second electric power from the total electric power upper limit value becomes a second predetermined value or greater, and set the upper limit value of the second electric power so that the sum of the upper limit value of the second electric power and the first electric power becomes smaller than the total electric power upper limit value by the second predetermined value or greater in a mode after the switching.

7. The electric power supply control apparatus for the vehicle according to claim 1, wherein, in a mode before the switching, the first electric power is the driving electric power, and the second electric power is the temperature controlling electric power.

8. The electric power supply control apparatus for the vehicle according to claim 2, wherein, in a mode before the switching, the first electric power is the driving electric power, and the second electric power is the temperature controlling electric power.

9. The electric power supply control apparatus for the vehicle according to claim 3, wherein, in a mode before the switching, the first electric power is the driving electric power, and the second electric power is the temperature controlling electric power.

10. The electric power supply control apparatus for the vehicle according to claim 1, wherein the apparatus is configured to limit at least one of an increasing rate and a decreasing rate of the driving electric power during switching the modes to a predetermined permissible value or smaller.

11. The electric power supply control apparatus for the vehicle according to claim 2, wherein the apparatus is configured to limit at least one of an increasing rate and a decreasing rate of the driving electric power during switching the modes to a predetermined permissible value or smaller.

12. The electric power supply control apparatus for the vehicle according to claim 3, wherein the apparatus is configured to limit at least one of an increasing rate and a decreasing rate of the driving electric power during switching the modes to a predetermined permissible value or smaller.

13. The electric power supply control apparatus for the vehicle according to claim 1, wherein the apparatus is configured to set an upper limit value of the driving electric power to the total electric power upper limit value in the driving prioritizing mode.

14. The electric power supply control apparatus for the vehicle according to claim 2, wherein the apparatus is configured to set an upper limit value of the driving electric power to the total electric power upper limit value in the driving prioritizing mode.

15. The electric power supply control apparatus for the vehicle according to claim 3, wherein the apparatus is configured to set an upper limit value of the driving electric power to the total electric power upper limit value in the driving prioritizing mode.

16. An electric power supply control method for a vehicle, the vehicle comprising:
a battery;
an electric motor configured to generate a driving force of the vehicle by receiving driving electric power from the battery; and
a temperature controller configured to heat or cool at least one of a vehicle cabin and the battery by receiving temperature controlling electric power from the battery,
the method comprising:
executing
a driving prioritizing mode in which a supply of the driving electric power is prioritized over a supply of the temperature controlling electric power within a range of an upper limit value of a predetermined driving electric power, and
a temperature control prioritizing mode in which the supply of the temperature controlling electric power is prioritized over the supply of the driving electric power within a range of an upper limit value of a predetermined temperature controlling electric power upper limit value; and,
decreasing a first electric power prior to switching the modes when a sum of a request value of a second electric power and the first electric power exceeds a total electric power upper limit value in the mode before the switching, and switching the modes after the sum of the decreased first electric power and the request value of the second electric power becomes equal to or smaller than the total electric power upper limit value, the first electric power being the electric power of which supply is prioritized in each of the modes among the electric power of the driving electric power and the temperature controlling electric power, the second electric power being the electric power of which supply is not prioritized, and the total electric power upper limit value being an upper limit value of electric power that can be used by at least one of the electric motor and the temperature controller within electric power that can be output by the battery.

17. An electric power supply control apparatus for a vehicle, the vehicle comprising;
a battery;
an electric motor configured to generate a driving force of the vehicle by receiving driving electric power from the battery; and
a temperature controller configured to heat or cool at least one of a vehicle cabin and the battery by receiving temperature controlling electric power from the battery,
the electric power supply control apparatus for the vehicle comprising circuitry configured to execute:
a driving prioritizing mode in which a supply of the driving electric power is prioritized over a supply of the temperature controlling electric power within a range of an upper limit value of a predetermined driving electric power; and
a temperature control prioritizing mode in which the supply of the temperature controlling electric power is prioritized over the supply of the driving electric power within a range of an upper limit value of a predetermined temperature controlling electric power upper limit value, and
decrease a first electric power prior to switching the modes when a sum of a request value of a second electric power and the first electric power exceeds a total electric power upper limit value in the mode before the switching, and switch the modes after the sum of the decreased first electric power and the request value of the second electric power becomes equal to or smaller than the total electric power upper limit value, the first electric power being the electric power of which supply is prioritized in each of the modes among the electric power of the driving electric power and the temperature controlling electric power, the second electric power being the electric power of which supply is not prioritized, and the total electric power upper limit value being an upper limit value of electric power that can be used by at least one of the electric motor and the temperature controller within electric power that can be output by the battery.

* * * * *